S. GOLDFADEN.
RIMMED EYEGLASSES AND SPECTACLES.
APPLICATION FILED MAY 27, 1919.
1,341,503.
Patented May 25, 1920.
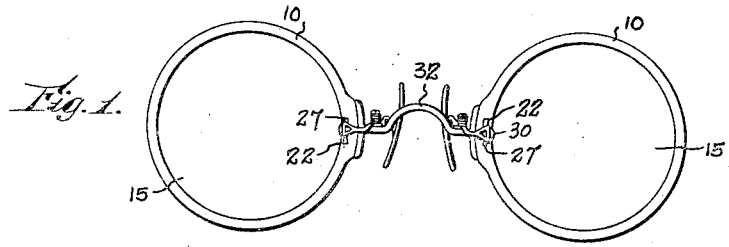
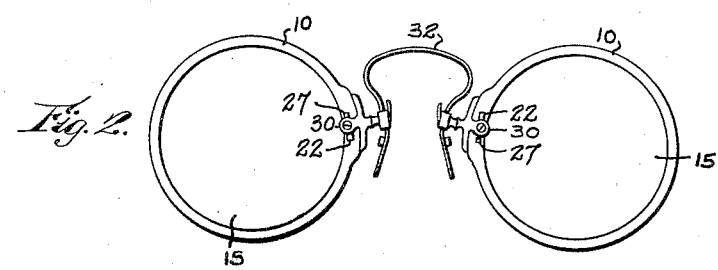
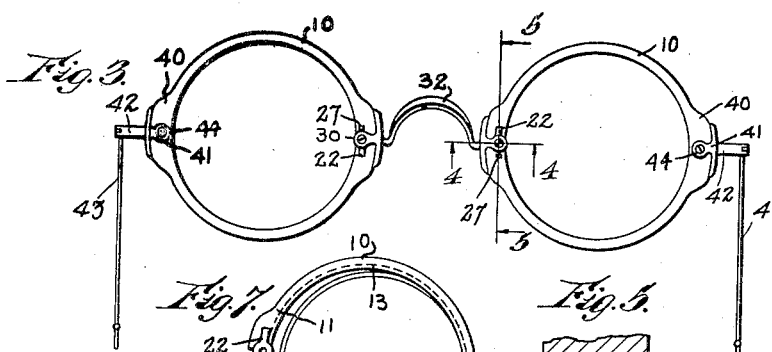
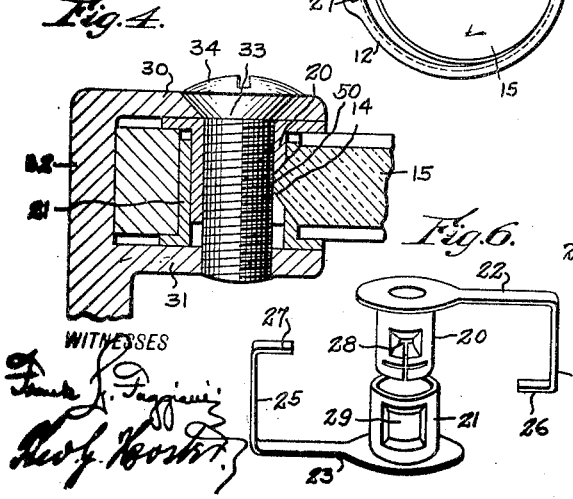
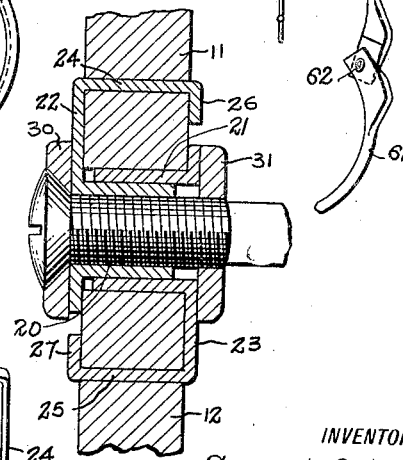
WITNESSES
INVENTOR
Samuel Goldfaden,
BY
ATTORNEYS

UNITED STATES PATENT OFFICE.

SAMUEL GOLDFADEN, OF NEW YORK, N. Y.

RIMMED EYEGLASSES AND SPECTACLES.

1,341,503.

Specification of Letters Patent.

Patented May 25, 1920.

Application filed May 27, 1919. Serial No. 300,027.

*To all whom it may concern:*

Be it known that I, SAMUEL GOLDFADEN, a citizen of the United States, and a resident of the city of New York, borough of Manhattan, in the county and State of New York, have invented new and useful Improvements in Rimmed Eyeglasses and Spectacles, of which the following is a full, clear, and exact description.

The invention relates to eyeglasses and spectacles having rims of shell, celluloid or other similar material.

The object of the invention is to provide certain new and useful improvements in rimmed eyeglasses and spectacles whereby an optician is enabled to quickly and conveniently fit any one of the many types of bridges or temples to the rims as desired by a customer. Another object is to permit the optician to conveniently place the lenses in position in the rims without requiring heating thereof. Another object is to securely fasten the lenses in place in the rims and the nosepieces to the rims to connect the same with each other. Another object is to prevent the lenses from turning in the rims especially when cleaning the same thereby preventing misalinement of the lenses relative to the wearer's eye especially if the lenses are circular.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a front view of eyeglasses having a rigid bridge and provided with the improvements;

Fig. 2 is a similar view of eyeglasses provided with a spring bridge and with the improvements;

Fig. 3 is a similar view of spectacles provided with the improvements;

Fig. 4 is an enlarged inverted sectional plan view of the improvements on the line 4—4 of Fig. 3;

Fig. 5 is an enlarged transverse section of the same on the line 5—5 of Fig. 3;

Fig. 6 is a perspective view of the coacting hubs in disassembled position;

Fig. 7 is an enlarged face view of the split end of the rim with the hubs in position thereon; and Fig. 8 is a face view of the outer portion of a rim for spectacles.

Each of the rims 10 is split or open at the nose side to form enlarged abutting ends 11 and 12, and each rim 10 is provided at its inner edge with a groove 13 into which fits the sharp peripheral edge 14 of a lens 15 to be held in the rim 10. On the enlarged ends 11 and 12 and on opposite sides thereof are secured metallic hubs 20 and 21 having their centers approximately in alinement with the abutting faces of the ends, as plainly shown in Fig. 7. The hub 20 fits into the hub 21 (see Figs. 4 and 5) and the said hubs are provided with arms 22, 23 overlying the front and rear faces of the enlarged ends 11 and 12 of the rim 10, and the said arms 22 and 23 terminate in prongs 24, 25 passing transversely through the enlarged ends 11 and 12 (see Fig. 5) and having their terminals 26 and 27 clenched on the corresponding opposite faces of the ends 11 and 12, as plainly shown in said figure. The hubs 20 and 21 are provided with openings 28 and 29 adapted to register with each other at the time the hub 20 is pushed into the hub 21, and the said registering openings 28 and 29 are engaged by a corresponding portion of the sharp edge 14 of the lens 15 to lock the hubs 20 and 21 against disengagement. In order to allow the hub 21 to snap onto the sharp edge 14 without breaking the same the hub 20 is slitted from the opening to the outer edge (see Fig. 6) to render this hub portion sufficiently yielding to pass over the sharp edge 14 when pushing the hub 20 into the hub 21. It will be noticed that the hubs 20 and 21 when fitting one into the other hold the ends 11 and 12 of the split rim 10 locked together and consequently the lens 15 is securely held in place in the rim 10, and the lens 15 by engaging the registering openings 28 and 29 locks the hubs 20 and 21 in position one within the other. By abutting the ends 11 and 12 and fastening the ends together by the interlocking hubs 20 and 21, the split or open portion of the rim is rendered exceedingly strong and the interlocked hubs provide a convenient means for attaching the corresponding side of the bridge or nosepiece to the rim with a view to fasten two rims together without requiring drilling of holes into the lenses or requiring heating and temporary enlargement of the rims for placing the lenses into the rims.

The outer ends of the hubs 20 and 21 are engaged by ears 30 and 31 of the bridge or nose piece 32 of any approved construction and a bolt 33 extends through the innermost hub 20 and engages the ears 30 and 31 to securely fasten the bridge or nose piece 32 in position. It is understood that the bolt 33 has its head 34 engaging the ear 30 and the said bolt 33 screws into the other ear 31 to fasten the nose piece or bridge in place and to provide an additional fastening means for fastening the telescoping hubs 20 and 21 together. It is understood that the bridges or nose pieces 32 may be of any of the well known types now in use and hence I do not limit myself to any one of the particular bridges or nose pieces for eyeglasses or spectacles as the improvement readily permits of fastening any one of the types of bridges or nose pieces to a pair of rims in the manner above set forth. In the case of spectacles, the diametrically opposite or outer portions 40 of the rims 10 are enlarged for engagement by the ears 41 of the temple posts 42 carrying the temples 43, the ears being fastened in place by the bolts 44 extending through the enlarged portions 40.

In order to prevent a lens and particularly a cylindrical lens from turning in the rim 10, the edge 14 of the lens 15 projects slightly into the path of the screw 33 and on packing the screw 33 into the hub 20 it breaks out the projecting portion of the sharp edge 14 of the lens 15 and thus forms a recess 50 engaged by the screw to hold the lens from turning in the rim 10. The recess 50 may, however, be produced in the edge 14 by the grinder of the lens at the correct place relative to the axis of the lens to insure locking of the lens in accurate position when placed in the rim.

From the foregoing it will be seen that an optician can quickly and conveniently fit any one of the many types of bridges or temples to the rims as desired by a customer.

It will further be noticed that the split rim 10 can be readily opened to permit of conveniently placing the lens in position on the rim, and then the optician by engaging the rim 10 with the hub 21 securely locks the lens in place, at the same time holding the ends of the rim 10 securely fastened together. The ears 30 and 31 of the nose piece or bridge 32 readily straddles the connected ends and the hubs 20 and 21 and the said ears are quickly fastened in place by the optician screwing in the bolt 33.

If desired, the rim may be made in two parts 60 and 61 (see Fig. 8) hinged together at the outer side of the rim, the hinge 62 being in the form of an eyelet for the passage of the screw 44 for fastening the ears 41 of the temple post 42 in place. It is understood that in this case the free ends of the rim parts 60 and 61 are provided with the hubs 20 and 21 as described above.

Having thus described my invention, I claim as new and desire to secure by Letters Patent:—

1. In rimmed eyeglasses and spectacles, an open rim adapted to hold a lens, interlocking members at the ends of the said open rim, and extending approximately parallel to the optical axis of the lens, and means holding the said interlocking members in interlocked position.

2. In rimmed eyeglasses and spectacles, an open rim adapted to hold a lens, hubs fitting one in the other and attached to the ends of the said open rim, the hubs extending approximately parallel to the optical axis of the lens, and means fastening the hubs together.

3. In rimmed eyeglasses and spectacles, an open rim adapted to hold a lens, hubs fitting one in the other and having prongs engaging the ends of the open rim to fasten the hubs to the said ends, a nose piece having ears registering with said hubs, and means engaging the innermost hub and the ears to fasten the parts together.

4. In rimmed eyeglasses and spectacles, an open rim having a groove at its inner edge, a lens having a sharp peripheral edge fitting the said groove, and transverse hubs attached to the ends of the rim and fitting one in the other, the hubs having registering openings into which extends the said lens edge.

5. In rimmed eyeglasses and spectacles, a split rim having a groove at its inner edge, a lens having a sharp edge fitting the said groove, transverse hubs attached to the ends of the rim and fitting one in the other, the said hubs having registering openings into which extends the sharp edge of the lens, and a bolt passing through the inner hub and breaking out the projecting portion of the sharp edge of the lens to hold the lens against turning in the rim.

6. In rimmed eyeglasses and spectacles, a split rim having a groove at its inner edge, a lens having a sharp peripheral edge fitting the said groove, transverse hubs having attaching prongs engaging the ends of the split rim to fasten the hubs to the rim, the hubs projecting beyond the ends of the rim and fitting one into the other, the hubs having registering openings into which fits a corresponding portion of the said lens edge, a nose piece having ears straddling the rim and registering with the said hubs, and a bolt engaging the ears and extending through the innermost hub, the said lens having a recess at its sharp edge engaged by the said bolt to hold the lens against turning in the rim.

7. In rimmed eyeglasses and spectacles, a split rim having a groove at its inner edge, a lens having a sharp peripheral edge fitting the said groove, transverse hubs having attaching prongs engaging the ends of the split rim to fasten the hubs to the rim, the hubs projecting beyond the ends of the rim and fitting one into the other, the hubs having registering openings into which fits a corresponding portion of the said lens edge, a nose piece having ears straddling the rim and registering with the said hubs, and a bolt engaging the ears and extending through the innermost hub.

8. In rimmed eyeglasses and spectacles, a split rim having a groove at its inner edge, a lens having a sharp peripheral edge fitting into the said groove, and transverse hubs attached to the ends of the rim and fitting one into the other, the hubs having registering openings into which extends the sharp edge of the lens to lock the hubs together, the inner hub having a yielding portion adjacent its opening to yield when pushing the inner hub over the sharp lens edge into the outer hub.

9. In rimmed eyeglasses and spectacles, a rim open at the nose side to provide abutting ends, and hubs attached to the said ends and fitting one into the other, the hubs extending approximately parallel to the axis of the rim, the coinciding axes of the hubs being approximately in the joint of the abutting ends.

SAMUEL GOLDFADEN.